United States Patent
Liu et al.

(10) Patent No.: US 8,933,600 B2
(45) Date of Patent: Jan. 13, 2015

(54) BRUSHLESS DC MOTOR STRUCTURE HAVING A FAN RADIATOR FOR DISSIPATING HEAT FROM THE MOTOR AND THE CONTROLLER

(75) Inventors: Yonggang Liu, Zhongshan (CN); Songfa Tang, Zhongshan (CN)

(73) Assignee: Zhongshan Broad-Ocean Motor Co., Ltd., Zhongshan (CN)

(*) Notice: Subject to any disclaimer, the term of this patent is extended or adjusted under 35 U.S.C. 154(b) by 387 days.

(21) Appl. No.: 13/288,946

(22) Filed: Nov. 3, 2011

(65) Prior Publication Data
US 2012/0133223 A1  May 31, 2012

(30) Foreign Application Priority Data
Nov. 29, 2010 (CN) .................. 2010 2 0646845 U

(51) Int. Cl.
  H02K 5/20 (2006.01)
  H02K 9/04 (2006.01)
  H02K 9/14 (2006.01)
  H02K 5/22 (2006.01)
  H02K 5/18 (2006.01)
  H02K 11/00 (2006.01)

(52) U.S. Cl.
  CPC .. H02K 9/14 (2013.01); *H02K 5/18* (2013.01); *H02K 11/0073* (2013.01)
  USPC .............................. 310/62; 310/63; 310/68 R

(58) Field of Classification Search
  CPC ........... H02K 5/225; H02K 5/04; H02K 5/18; H02K 5/20; H02K 5/22; H02K 9/02; H02K 9/04
  USPC ............................................ 310/62, 63, 68 R
  IPC .................... H02K 5/04, 5/06, 5/18, 5/20, 5/22, H02K 9/02, 9/04
  See application file for complete search history.

(56) References Cited

U.S. PATENT DOCUMENTS

| 4,465,948 A * | 8/1984 | Oyama et al. .................... 310/62 |
| 4,668,898 A * | 5/1987 | Harms et al. ................. 310/68 R |
| 5,714,816 A * | 2/1998 | Jensen et al. .................... 310/64 |
| 6,731,036 B2 * | 5/2004 | Ghiotto ........................... 310/58 |

* cited by examiner

*Primary Examiner* — Michael Andrews
(74) *Attorney, Agent, or Firm* — Matthias Scholl P.C.; Matthias Scholl

(57) ABSTRACT

A brushless DC motor structure including a motor body, a controller, and a fan radiator. The fan radiator is mounted between the motor body and the controller to disperse heat from the motor body and the controller. The brushless DC motor structure increases air flow on the surface of the motor body and the controller by the fan radiator and speeds up heat dispersion, and meanwhile effectively controls the operating temperature of the motor body and the controller. Thus, the brushless DC motor structure has an excellent heat dispersion capability, and the failure rate thereof has been largely reduced.

4 Claims, 6 Drawing Sheets

BRUSHLESS DC MOTOR STRUCTURE HAVING A FAN RADIATOR FOR DISSIPATING HEAT FROM THE MOTOR AND THE CONTROLLER

CROSS-REFERENCE TO RELATED APPLICATIONS

Pursuant to 35 U.S.C. §119 and the Paris Convention Treaty, this application claims the benefit of Chinese Patent Application No. 201020646845.5, filed Nov. 29, 2010, the contents of which are incorporated herein by reference.

BACKGROUND OF THE INVENTION

1. Field of the Invention

The invention relates to a brushless DC motor structure.

2. Description of the Related Art

Conventionally, a brushless DC motor structure includes a motor body and a controller. The motor body includes a stator module, a rotor module, an axis of rotation, a front end cover, a casing, and a rear end cover. The front end cover and the rear end cover are mounted at two ends of the casing. The stator module and the rotor module are mounted inside the casing. The controller includes a box, a control circuit board mounted inside the box, and a box cover. The motor body and the controller are usually connected together with air vents disposed on top of the casing or a cast aluminum piece is employed for the controller's box to increase heat dispersion of power electronic components.

However, this kind of heat dispersion method is far from meeting the actual operating requirements of motors with the following disadvantages: 1) dust and rain water are likely to enter the motor through the air vents to cause motor failure and it is harmful for the running motors because heat dispersion effect is not ideal and operating temperature is relatively high; and 2) since the controllers generally have an enclosed structure, if only a cast aluminum piece works to disperse heat, the heat dispersion effect will not be as perfect as expected, often causing high temperature and motor failure.

SUMMARY OF THE INVENTION

In view of the above-described problems, it is one objective of the invention to provide a brushless DC motor structure with an excellent heat dispersion effect to increase air flow on the surface of the motor body and the controller by a fan radiator to speed up heat dispersion, and meanwhile effectively control the operating temperature of the motor body and the controller, and thus failure rate has been largely reduced.

To achieve the above objective, in accordance with one embodiment of the invention, there is provided a brushless DC motor structure comprising a motor body, a controller, and a fan radiator, the fan radiator is mounted between the motor body and the controller to disperse heat from the motor body and the controller.

In a class of this embodiment, the fan radiator comprises a fan cover and a fan; the motor body comprises a stator module, a rotor module, an axis of rotation, a front end cover, a casing, and a rear end cover, and the front end cover and the rear end cover are mounted at two ends of the casing while the stator module and the rotor module are mounted inside the casing; an end portion of the axis of rotation mounted on the rotor module extends into the fan cover and the fan is mounted at the end portion of the axis of rotation.

In a class of this embodiment, the fan cover comprises an air inlet on its top surface and the air inlet is directed towards an outer surface of the casing.

In a class of this embodiment, the controller comprises a box, a control circuit board mounted inside the box, and a box cover.

In a class of this embodiment, the fan cover comprises an air outlet, which is directed towards a side surface of the box.

In a class of this embodiment, the fan cover has a portion of outer edge projecting out from the box and the air outlet is arranged at the bottom of the outer edge.

In a class of this embodiment, the outer surface of the casing protrudes with a plurality of heat sink strips, a flow-guided slot forms between the heat sink strips, and the flow-guided slot is connected with the air inlet.

In a class of this embodiment, an exterior perimeter of the rear end cover is arranged with a through hole connecting with the air inlet.

In a class of this embodiment, a top surface of the fan cover is connected with the rear end cover via screws.

In a class of this embodiment, an inner wall of the fan cover extends with a plurality of ribs, which are connected with the box cover via screws.

In a class of this embodiment, both the casing and the box are cast aluminium pieces.

Advantages of the invention are summarized below:

1) a fan radiator is mounted between the motor body and the controller to increase air flow on the surface thereof, speed up heat dispersion, and meanwhile effectively control the operating temperature of the motor body and the controller, and thus failure rate has been largely reduced;
2) the fan cover comprises an air inlet on its top surface and the air inlet is directed towards the outer surface of the casing, the fan cover has a portion of outer edge projecting out from the box, the air outlet is arranged at the bottom of the outer edge and directed towards the side surface of the box. Such structure is simple and reasonable and easy to be implemented;
3) the outer surface of the casing protrudes with a plurality of heat sink strips forming a flow-guided slot therebetween and the flow-guided slot is connected with the air inlet. The flow-guided slot increases heat dispersion area of the outer surface of the casing, thereby speeding up the heat dispersion. Such structure is designed reasonably;
4) the exterior perimeter of the rear end cover is arranged with a through hole connecting with the air inlet, which allows the cool air to first enter into the flow-guided slot formed by the heat sink strips and then into the air inlet of the fan cover. Such structure has a function of guiding the air flow; and
5) the top surface of the fan cover is connected with the rear end cover via screw; the inner wall of the fan cover extends with a plurality of ribs, which are connected with the box cover via screws; both the casing and the box are cast aluminium pieces. Such structure is simple and reasonable.

DETAILED DESCRIPTION OF THE EMBODIMENTS

The invention is explained in further detail below with reference to the embodiments and accompanying drawings.

Figure 1:
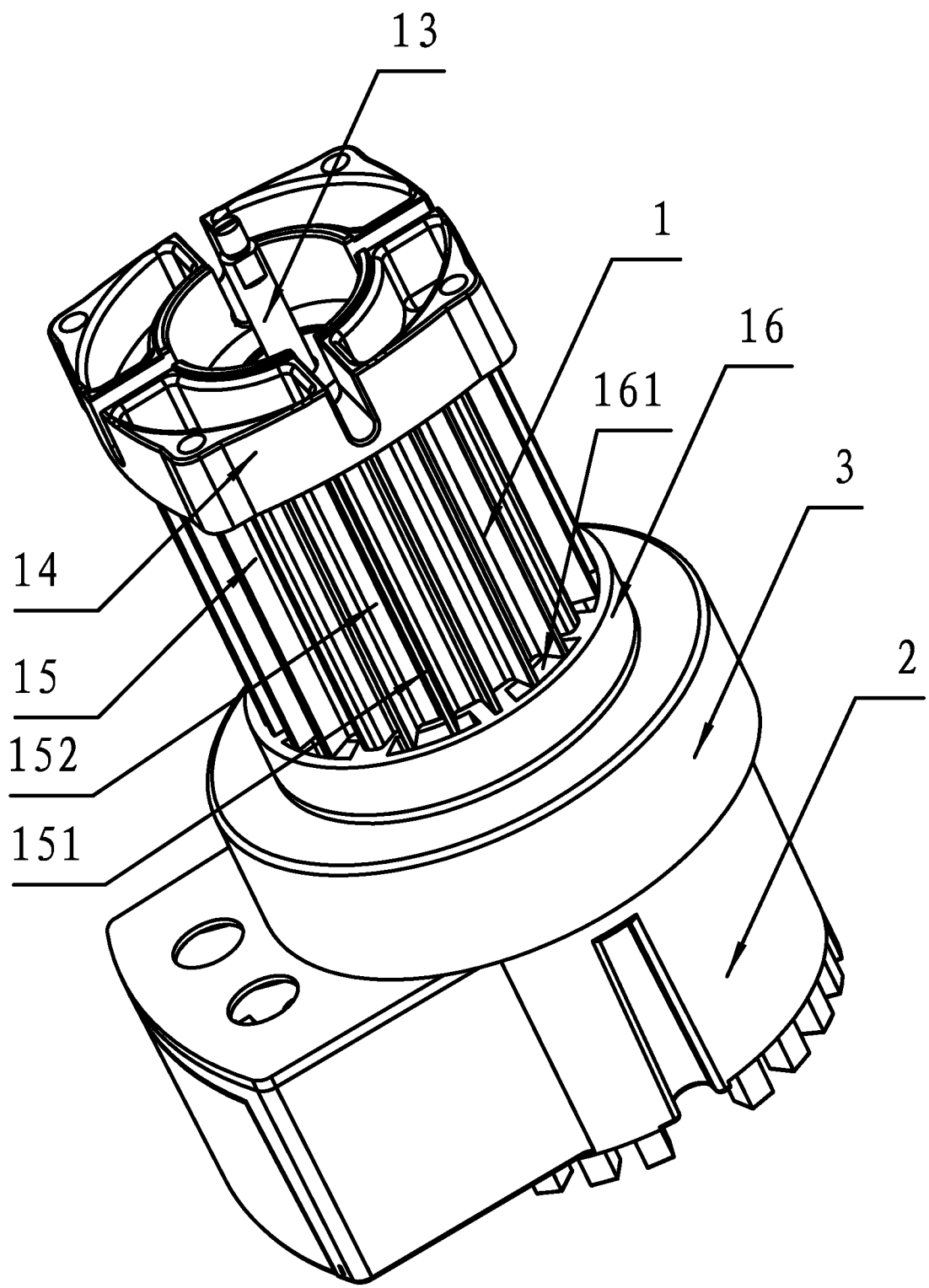
FIG. 1 is a three-dimensional diagram of a brushless DC motor structure in accordance with one embodiment of the invention.
Figure 2:
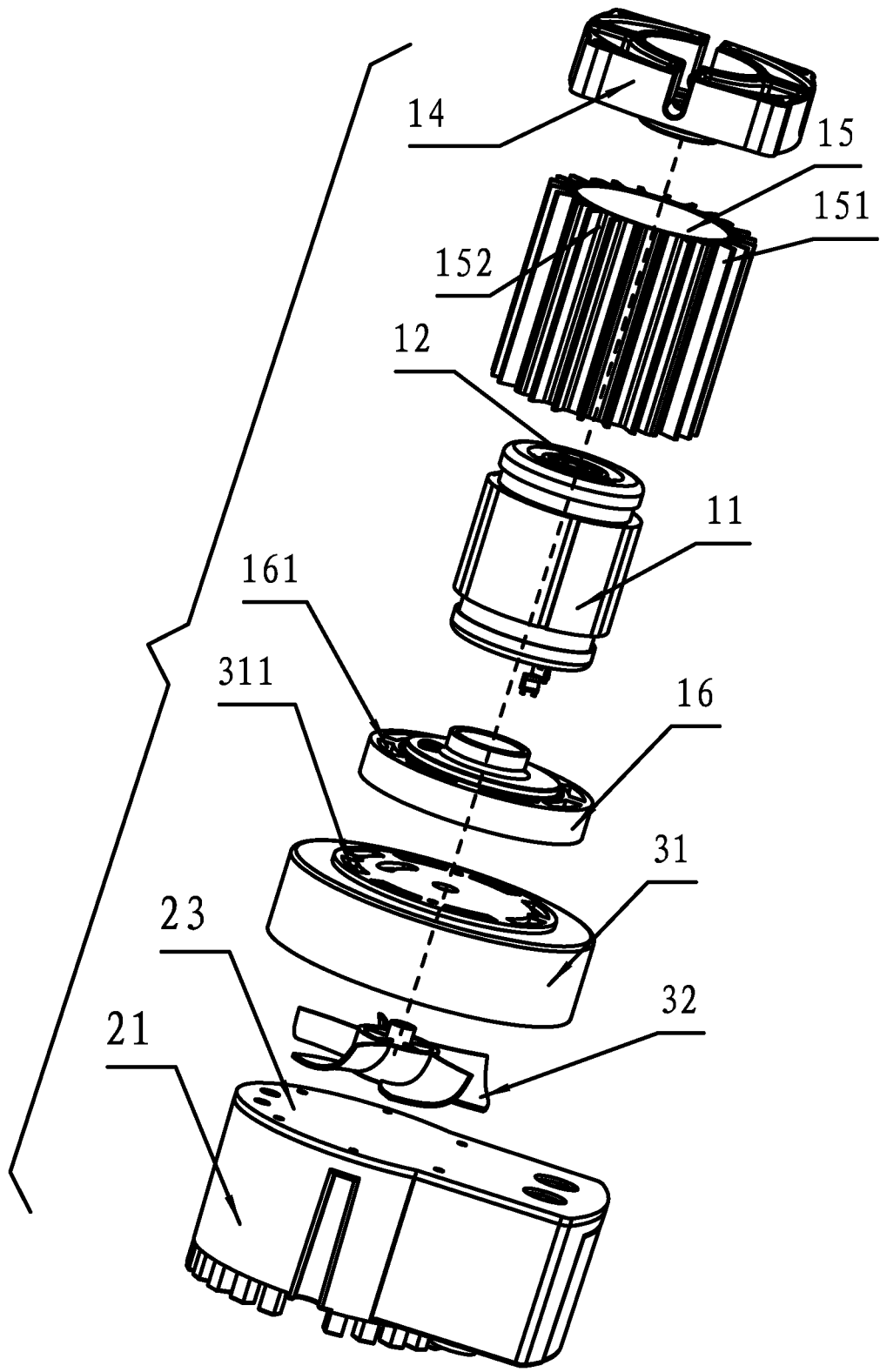
FIG. 2 is an exploded view of a brushless DC motor structure in accordance with one embodiment of the invention.
Figure 3:
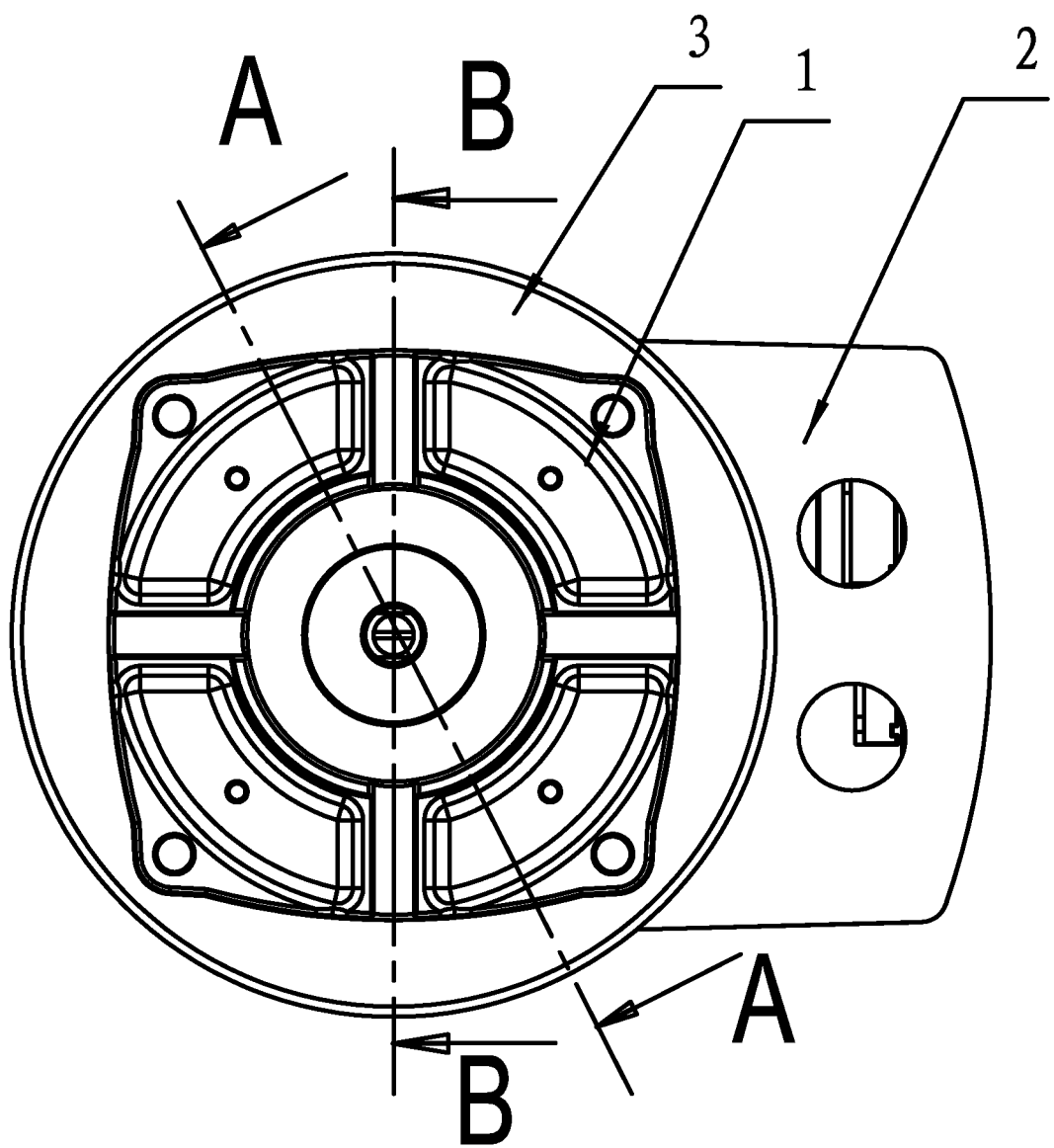
FIG. 3 is a front view of a brushless DC motor structure in accordance with one embodiment of the invention.
Figure 4:
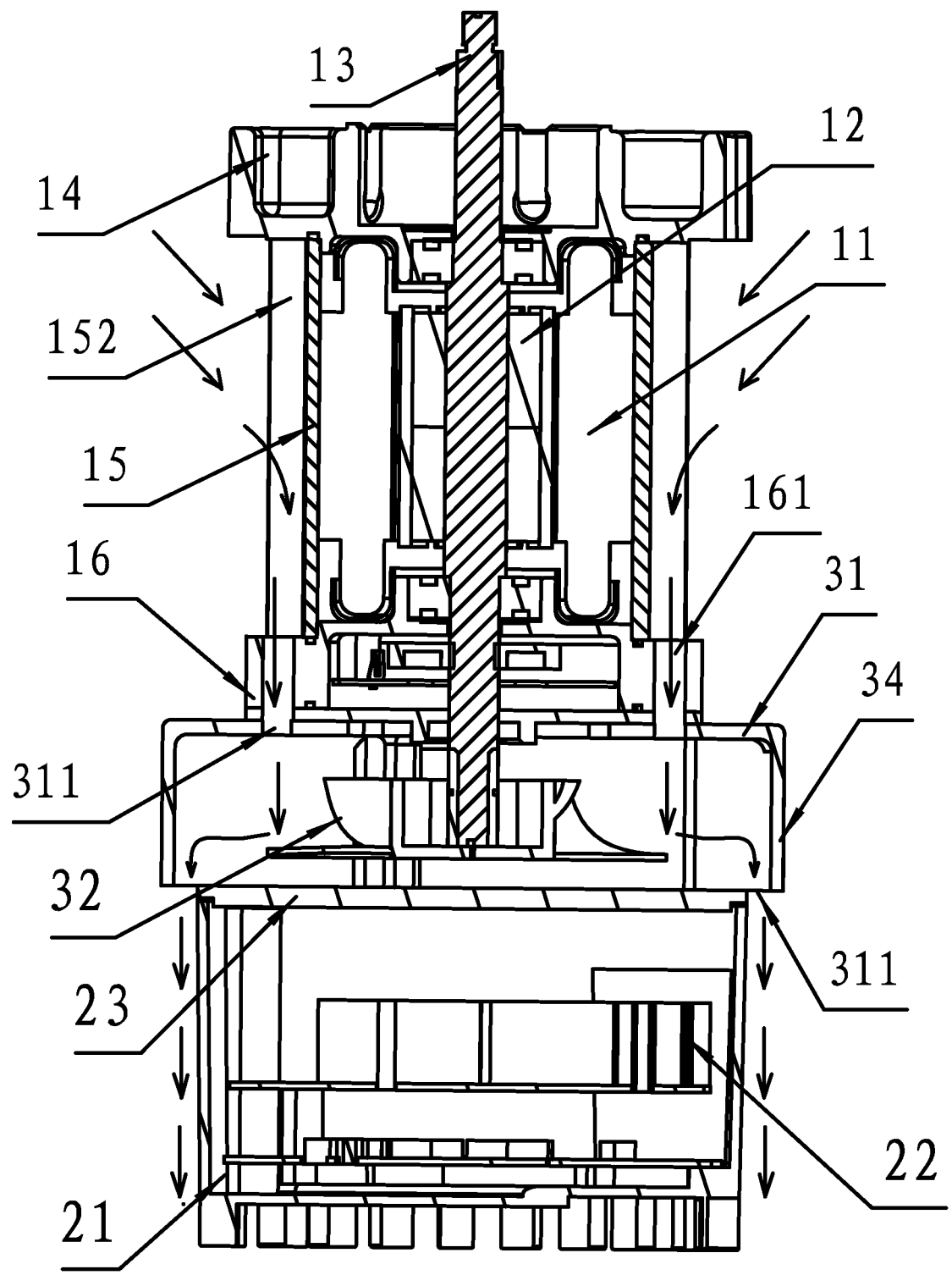
FIG. 4 is an A-A sectional view of FIG. 3.
Figure 5:
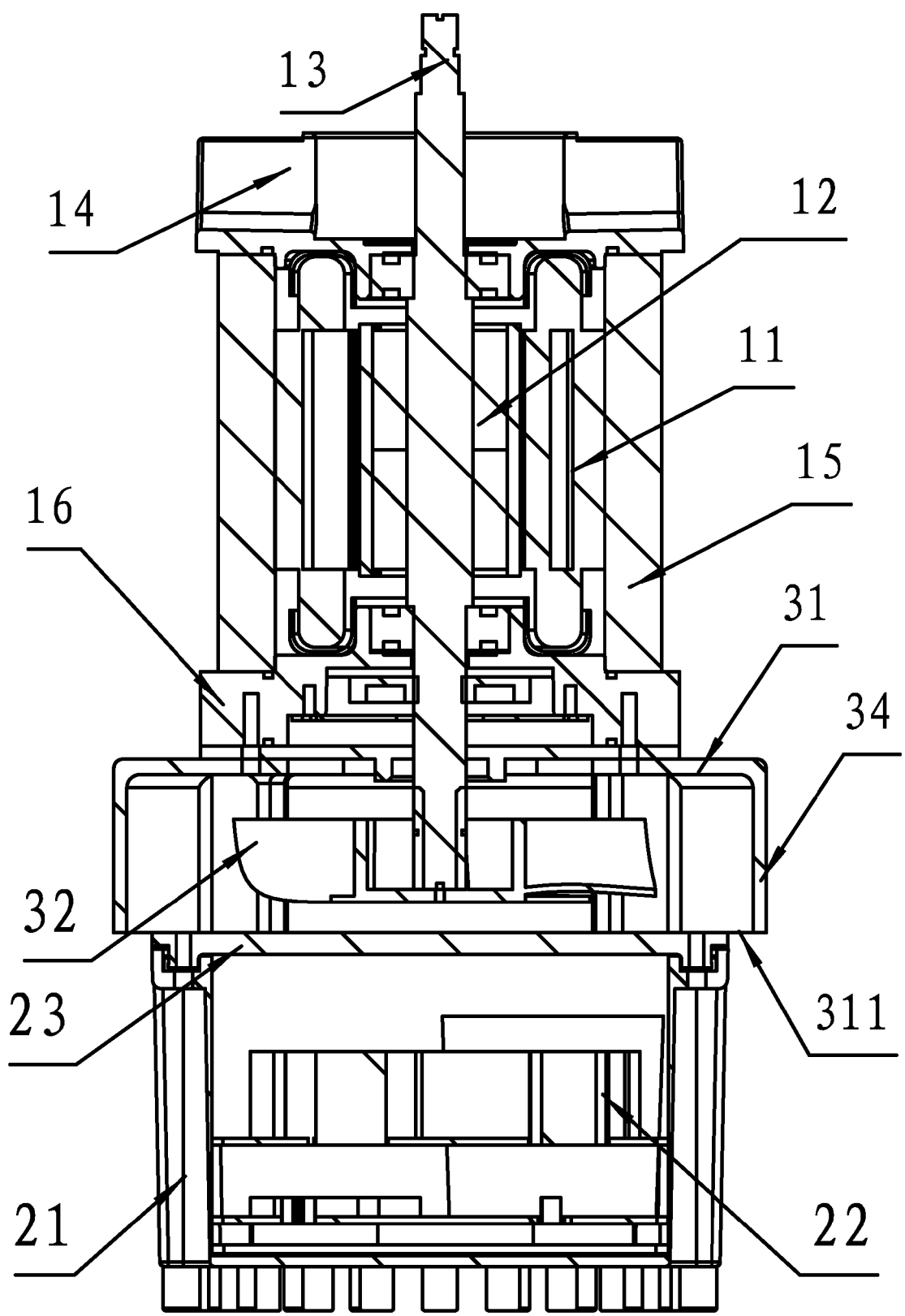
FIG. 5 is a B-B sectional view of FIG. 3.
Figure 6:
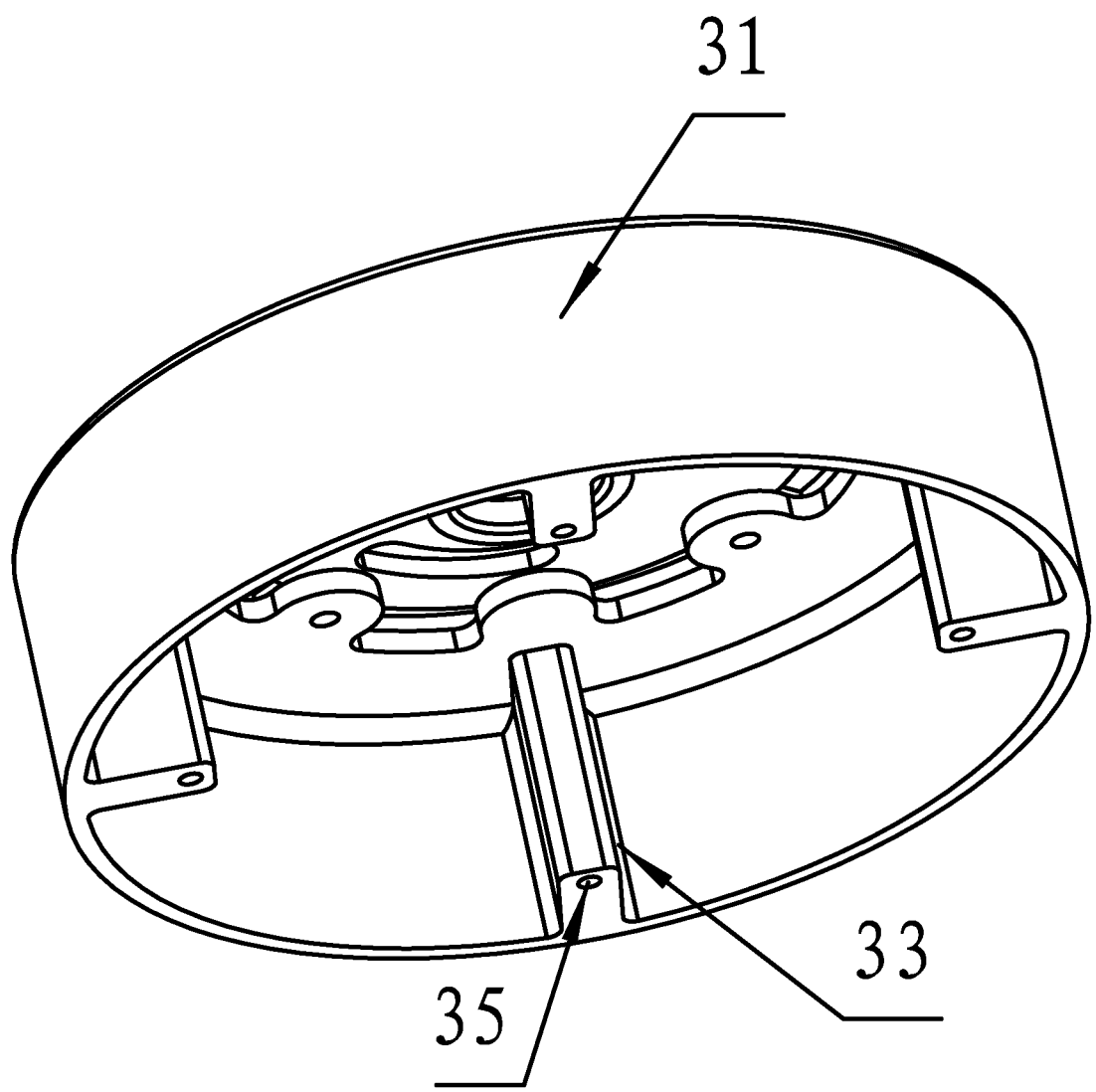
FIG. 6 is a three-dimensional diagram of a fan cover in accordance with one embodiment of the invention.

As shown in FIGS. 1-6, a brushless DC motor structure comprises a motor body 1 and a controller 2, a fan radiator 3 is mounted therebetween to disperse heat from the motor body 1 and the controller 2. The fan radiator 3 comprises a fan cover 31 and a fan 32. The motor body 1 comprises a stator module 11, a rotor module 12, an axis of rotation 13, a front end cover 14, a casing 15, and a rear end cover 16. The front end cover 14 and the rear end cover 16 are mounted at two ends of the casing 15 while the stator module 11 and the rotor module 12 are mounted inside the casing 15. An end portion of the axis of rotation 13 mounted on the rotor module 12 extends into the fan cover 31 and the fan 32 is mounted at the end portion of the axis of rotation 13. The fan cover 31 comprises an air inlet 311 on its top surface and the air inlet 311 is directed towards the outer surface of the casing 15. The controller 2 comprises a box 21, a control circuit board 22 mounted inside the box 21, and a box cover 23. The fan cover 31 comprises an air outlet 312, which is directed towards the side surface of the box 21. The fan cover 31 has a portion of outer edge 34 projecting out from the box 21 and the air outlet 312 is arranged at the bottom of the outer edge 34. An outer surface of the casing 15 protrudes with a plurality of heat sink strips 151 forming a flow-guided slot 152 therebetween and the flow-guided slot 152 is connected with the air inlet 311. An exterior perimeter of the rear end cover 16 is arranged with a through hole 161 connecting with the air inlet 311. A top surface of the fan cover 31 is connected with the rear end cover 16 via screws. An inner wall of the fan cover 31 extends with a plurality of ribs 33. The bottom of the ribs 33 are disposed with threaded holes 35. The ribs 33 are connected with the box cover 23 via screws. Both the casing 15 and the box 21 are cast aluminium pieces.

Working principle of the invention is summarized below. The casing 15 of the motor body 1 and the box 21 of the controller 2 are both cast aluminium pieces. When the motor works, the axis of rotation 13 rotates at a high speed and the fan radiator 3 mounted between the motor body 1 and the controller 2 starts to work, hence the cool air flows into the through hole 161 and the air inlet 311 along the heat sink strips 151 and the low-guided slot 152 at the outer surface of the casing 15 and then blows to the side surface of the box 21 via the air outlet 312. Since the cool air conducts high-speed circulation on the surface of the casing 15 and the box 21 to quickly disperse heat from them, it enables the motor to operate within a reasonable temperature range to effectively reduce motor failure caused by high temperature. Moreover, as the motor body 1 and the controller 2 are made in an enclosed structure, it is possible to reduce the influence of dust and water, thus the motor's reliability is improved.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A brushless DC motor structure, comprising:
   a) a motor body;
   b) a controller, the controller comprising a box having a box cover, and a control circuit board; the box cover comprising a cylindrical portion having a first cylindrical side wall; the control circuit board being mounted inside the cylindrical portion; and
   c) a fan radiator, the fan radiator comprising a fan, and a fan cover; the fan cover comprising a top wall, an air inlet disposed on the top wall, a second cylindrical side wall, a bottom, and an opening disposed at the bottom and confined by the second cylindrical side wall;

wherein:
   the motor body comprises a stator module, a rotor module, a rotational shaft, a front end cover, a casing having an outer surface, and a rear end cover;
   the front end cover and the rear end cover are mounted at two ends of the casing;
   the stator module and the rotor module are mounted inside the casing;
   the fan radiator is mounted between the motor body and the controller to disperse heat from the motor body and the controller:
   an end portion of the rotational shaft mounted on the rotor module extends into the fan cover and the fan is mounted at the end portion of the rotational shaft;
   the air inlet is directed towards the outer surface of the casing;
   a plurality of heat sink strips is disposed on the outer surface of the casing;
   a flow-guided slot is formed between the heat sink strips and the flow-guided slot is connected to the air inlet;
   the rear end cover is arranged with a through hole connecting with the air inlet;
   the opening is directed towards the first cylindrical side wall of the box; and
   the second cylindrical side wall projects radially away from the first cylindrical side wall.

2. The brushless DC motor structure of claim 1, wherein the top wall is connected with the rear end cover via screws.

3. The brushless DC motor structure of claim 1, wherein an inner wall of the fan cover extends with a plurality of ribs and the ribs are connected with the box cover via screws.

4. The brushless DC motor structure of claim 1, wherein both the casing and the box are cast aluminum pieces.

* * * * *